United States Patent

Masuko et al.

[11] Patent Number: 6,046,121
[45] Date of Patent: Apr. 4, 2000

[54] GLASS PASTE COMPOSITION

[75] Inventors: Hideaki Masuko, Akahoriminami-machi; Tadahiko Udagawa, Mie; Shigeru Abe, Mie; Atsushi Kumano, Mie; Kenji Okamoto, Mie; Hideyuki Kamii, Mie, all of Japan

[73] Assignee: JSR Corporation, Tokyo, Japan

[21] Appl. No.: 09/073,909

[22] Filed: May 7, 1998

[30] Foreign Application Priority Data

| May 9, 1997 | [JP] | Japan | 9-119791 |
| May 9, 1997 | [JP] | Japan | 9-119792 |
| May 9, 1997 | [JP] | Japan | 9-119793 |
| May 21, 1997 | [JP] | Japan | 9-131256 |

[51] Int. Cl.[7] .............. C03C 4/16; C03C 8/16; B32B 17/10; H01J 9/22
[52] U.S. Cl. .............. 501/20; 428/426; 445/24
[58] Field of Search .............. 501/20; 428/426; 445/24

[56] References Cited

U.S. PATENT DOCUMENTS

| 3,975,201 | 8/1976 | Greenstein | 501/20 |
| 4,444,813 | 4/1984 | Pirooz | 427/284 |
| 4,521,251 | 6/1985 | Otake et al. | 106/183 |
| 4,636,254 | 1/1987 | Husson, Jr. et al. | 106/1.14 |
| 4,655,864 | 4/1987 | Rellick | 501/20 |
| 4,761,224 | 8/1988 | Husson, Jr. et al. | 106/1.14 |
| 4,968,738 | 11/1990 | Dershem | 524/317 |
| 5,164,119 | 11/1992 | Nguyen et al. | 252/514 |
| 5,183,784 | 2/1993 | Nguyen et al. | 501/19 |

FOREIGN PATENT DOCUMENTS

| 0 315 314 | 5/1989 | European Pat. Off. . |
| 0 337 412 | 10/1989 | European Pat. Off. . |
| 0 360 587 | 3/1990 | European Pat. Off. . |
| 0 836 892 | 4/1998 | European Pat. Off. . |
| 2 296 272 | 7/1976 | France . |
| 6-321619 | 11/1994 | Japan . |
| 9-102273 | 4/1997 | Japan . |
| WO 93/02980 | 2/1993 | WIPO . |

OTHER PUBLICATIONS

Patent Abstracts of Japan, AN 08196304, vol. 097. No. 008, Aug. 29, 1997, JP 09 102273, Apr. 15, 1997.
Patent Abstracts of Japan, AN 07059905, vol. 096, No. 003, Mar. 29, 1996, JP 07 291662, Nov. 7, 1995.

Primary Examiner—C. Melissa Koslow
Attorney, Agent, or Firm—Oblon, Spivak, McClelland, Maier & Neustadt, P.C.

[57] ABSTRACT

A glass paste composition contains:
(A) glass powders (B) a binder resin; and (C) at least one organic solvent selected from a ketone, an alcohol and an ester which has property that the normal boiling point is 100 to 200° C., and the vapor pressure at 20° C. is 0.5 to 50 mmHg.

A plasma display panel is produced by a method which comprises
coating the glass paste composition on a base film to form a film forming material layer;
transferring the film forming material layer formed on the base film to a glass substrate; and
baking the transferred film forming material layer to form a dielectric layer on the surface of the glass substrate.

27 Claims, 1 Drawing Sheet

GLASS PASTE COMPOSITION

DETAILED DESCRIPTION OF THE INVENTION

Figure 1:
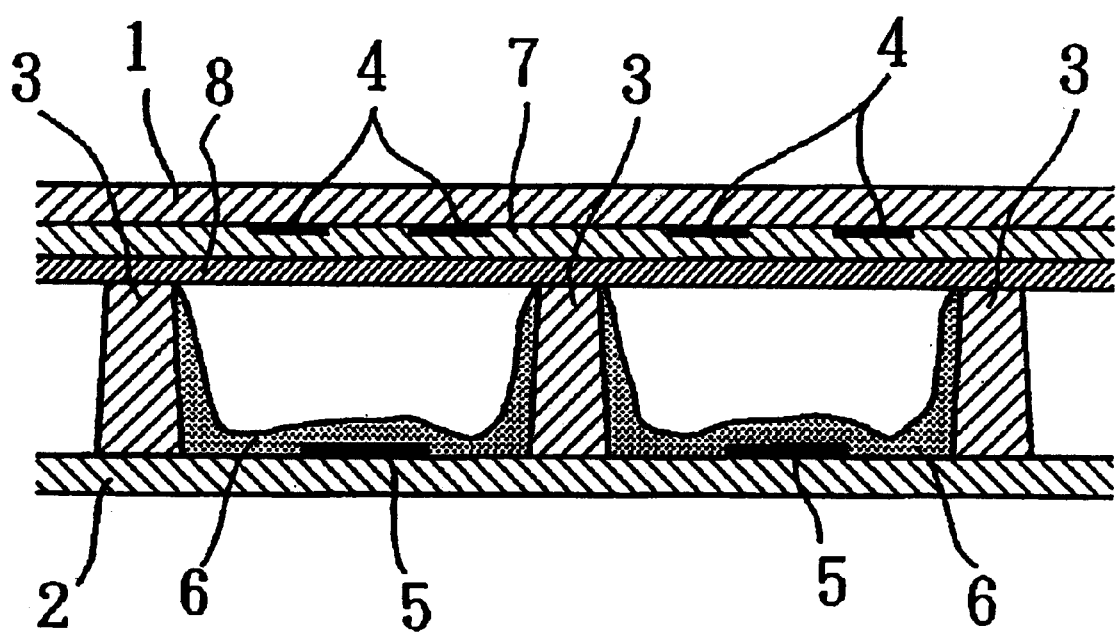

This invention relates to a glass paste composition and, more specifically, to a glass paste composition which can be advantageously used to form a dielectric layer for a plasma display panel.

Much attention has been recently paid to a plasma display as a flat fluorescent display. FIG. 1 is a diagram typically showing the section of an AC plasma display panel (also referred to as "PDP" hereinafter). In FIG. 1, reference numerals 1 and 2 denote glass substrates which are arranged to face each other, and 3 a barrier. Each cell is defined by the glass substrates 1 and 2 and the barriers 3. Reference numeral 4 represents a bus electrode fixed to the glass substrate 1, 5 an address electrode fixed to the glass substrate 2, 6 a fluorescent material held within each cell, 7 a dielectric layer formed on the surface of the glass substrate 1 to cover the bus electrodes 4, and 8 a protective film made from magnesium oxide, for example. The dielectric layer 7 is formed of a glass sintered body as thick as 20 to 50 $\mu$m, for example.

To form the dielectric layer 7, there is known a method in which a paste composition (glass paste composition) containing glass powders, a binder resin and a solvent is prepared, coated on the surface of the glass substrate 1 by a screen printing and dried to form a film forming material layer and then, this film forming material layer is baked to remove an organic material and sinter the glass powders.

As the solvent forming the glass paste composition is used an organic solvent having a relatively high boiling point (for example, 220° C. or higher) so that the glass paste composition can exhibit desirable viscosity (viscosity that does not cause the stuffing of the screen plate) over a long period of time (see JP-A 6-321619 (the term "JP-A" as used herein means an "unexamined published Japanese patent application")).

The coating film for obtaining the film forming material layer is generally dried at 100 to 150° C. for 10 to 15 minutes.

The thickness of the film forming material layer formed on the glass substrate 1 needs to be around 1.3 to 2.0 times the thickness of the dielectric layer 7 to be formed, in consideration of a reduction in the thickness of the layer caused by the removal of the organic material in the baking step. For example, to set the thickness of the dielectric layer 7 to 20 to 50 $\mu$m, it is necessary to form a film forming material layer having a thickness of ca. 30 to 100 $\mu$m.

Meanwhile, to coat the glass paste composition by the screen printing, the thickness of a coating film formed by one-time application is ca. 15 to 25 $\mu$m.

Therefore, to set the thickness of the film forming material layer to a predetermined value, the glass paste composition needs to be applied to the surface of the glass substrate several times (for example, 2 to 7 times) (by multi-printing).

However, when a film forming material layer is formed by multi-printing making use of a screen printing, a dielectric layer formed by baking the resulting film forming material layer does not have a uniform thickness (for example, a tolerance of ±5% or less). This is because it is difficult to uniformly coat the glass paste composition on the surface of the glass substrate by multi-printing making use of a screen printing. The larger the coating area (panel size) and the larger the number of times of application, the larger variations in the film thickness of the dielectric layer become. The dielectric characteristics of a panel material (glass substrate having the dielectric layer) obtained through a coating step by multi-printing are fluctuated due to variations in film thickness within the plane, which causes a display defect (uneven brightness) in PDP.

Further, as the mesh shape of the screen plate may be transferred to the surface of the film forming material layer by a screen printing, the dielectric layer formed by baking the film forming material layer is inferior in surface smoothness.

As means for solving the above problems occurring when the film forming material layer is formed by a screen printing, the inventors of the present invention have proposed a method of producing PDP comprising the step of forming a dielectric layer on the surface of the above glass substrate (also referred to as "dry film process" hereinafter) by coating a glass paste composition on a base film, drying the coated film to form a film forming material layer, transferring the film forming material layer formed on the base film to the surface of a glass substrate having electrodes fixed thereto, and baking the transferred film forming material layer (see JP-A 9-102273).

According to the above production method, a dielectric layer having a uniform thickness and a uniform surface can be formed, and a composite film (also referred to as "transfer film" hereinafter) having a film forming material layer formed on a base film can be rolled up for preservation advantageously.

In the above method, the coating film (glass paste composition) coated on the base film is dried at 110° C. or lower for 10 minutes or less from the viewpoint of the heat resistance of the base film and production efficiency.

However, the organic solvent having a boiling point of 220° C. or higher cannot be fully removed under the above low-temperature and short-time drying conditions with the result that a large amount (for example, 5 to 15 wt %) of the organic solvent remains in the film forming material layer formed on the base film.

When the transfer film comprising this film forming material layer is rolled up and preserved, surfaces (that is, film forming material layer surface and rear surface of the base) of the transfer film stick to each other (to be referred to as "blocking phenomenon" hereinafter) and the transfer film cannot be unrolled.

To eliminate this problem, it is conceivable that a low-boiling organic solvent is used to prepare a glass paste composition so as to reduce the amount of the residual solvent contained in the film forming material layer as much as possible.

However, the low-boiling organic solvent is generally inferior in affinity with glass powders, and agglomerates of glass powders are readily produced in a glass paste containing such organic solvent. Consequently, film defects such as striped coating traces, craters, pinholes or the like caused by the agglomerates are produced in the film forming material layer formed by coating the glass paste composition containing the agglomerates of glass powders on the base film.

A glass sintered body (dielectric layer) formed by baking the film forming material layer formed by coating a glass paste containing a low-boiling organic solvent is liable to be whitened due to the residual small air bubbles, whereby the dielectric layer does not have sufficient transparency (light transmittance).

The present invention has been made in view of the above circumstances, and it is a first object of the present invention to provide a quick-drying glass paste composition which can remove almost all the contained solvent (for example, the content of the solvent after drying being reduced to 0 to 1 wt %) under low-temperature and short-time drying conditions (for example, at 50 to 110° C. for 1 to 10 minutes).

A second object of the present invention is to provide a glass paste composition which does not contain agglomerates of glass powders.

A third object of the present invention is to provide a glass paste composition which does not produce film defects such as striped coating traces, craters and pinholes in a film forming material layer formed by drying a coating film thereof.

A fourth object of the present invention is to provide a glass paste composition which can form a dielectric layer having high light transmittance (sufficient transparency) by baking the obtained film forming material layer.

A fifth object of the present invention is to provide a glass paste composition which can be advantageously used for the production of a transfer film and prevents occurrence of a blocking phenomenon when the obtained transfer film is rolled up for preservation.

Other objects and advantages of the present invention will be apparent from the following description.

According to the present invention, the above objects and advantages of the present invention can be attained by a glass paste composition which comprises (A) glass powders, (B) a binder resin, and (C) at least one organic solvent (also referred to as "specific solvent" hereinafter) selected from the group consisting of ketones, alcohols and esters which satisfy the following conditions (1) and (2).

The above specific solvent preferably satisfies the following condition (3) as well.

Condition (1): The normal boiling point should be 100 to 200° C.
Condition (2): The vapor pressure at 20° C. should be 0.5 to 50 mmHg.
Condition (3): The surface tension at 20° C. should be 25 dyn/cm or more.

FIG. 1 of the accompanied drawing is a diagram typically showing the section of an AC plasma display panel.

The glass paste composition of the present invention will be described in detail hereinafter.

The glass paste composition of the present invention contains glass powders, a binder resin and a solvent as essential components.

<glass powders>

The glass powders forming the composition of the present invention preferably have a softening point of 400 to 600° C.

When the softening point of the glass powders is lower than 400° C., glass powders melt before an organic material such as a binder resin is fully decomposed and removed in the step of baking the film forming material layer of the composition. Therefore, part of the organic material remains in the formed dielectric layer with the result that the light transmittance of the dielectric layer tends to lower. On the other hand, when the softening point of the glass powders is higher than 600° C., the glass substrate is easily distorted because the glass powders must be baked at a temperature higher than 600° C.

Preferred examples of the glass powders include (a) a mixture of lead oxide, boron oxide and silicon oxide ($PbO—B_2O_3—SiO_2$), (2) a mixture of zinc oxide, boron oxide and silicon oxide ($ZnO—B_2O_3—SiO_2$), (3) a mixture of lead oxide, boron oxide, silicon oxide and aluminum oxide ($PbO—B_2O_3—SiO_2—Al_2O_3$), (4) a mixture of lead oxide, zinc oxide, boron oxide and silicon oxide ($PbO—ZnO—B_2O_3—SiO_2$) and the like.

The glass powders preferably have an average particle diameter of 0.3 to 3.0 μm.

<binder resin>

In the composition of the present invention, the binder resin is preferably an acrylic resin. When the above composition contains the acrylic resin as a binder resin, the film forming material layer formed has excellent flexibility, and the rollability of a transfer film is greatly improved when the film forming material layer is formed on the base film so as to form the transfer film. The film forming material layer containing an acrylic resin is also excellent in adhesive or close-contacting properties for the glass substrate.

The acrylic resin has appropriate stickiness, can bind glass powders and is selected from (co)polymers which are fully oxidized and removed by the baking treatment (400° C. to 600° C.) of the film forming material layer. The acrylic resin is exemplified by a homopolymer of a (meth)acrylate compound represented by the following general formula (1), a copolymer of two or more (meth)acrylate compounds represented by the following general formula (1), and a copolymer of a (meth)acrylate compound represented by the following general formula (1) and other monomer copolymerizable with the compound.

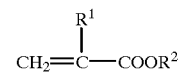

(1)

wherein $R^1$ is a hydrogen atom or a methyl group, and $R^2$ is a monovalent organic group.

Preferred examples of the monovalent organic group represented by $R^2$ include an alkyl group having 1 to 20 carbon atoms, hydroxyalkyl group having 2 to 20 carbon atoms, phenoxyalkyl group having 8 to 30 carbon atoms, alkoxyalkyl group having 3 to 25 carbon atoms, poly (oxyalkylene)group, cycloalkylene group having 5 to 30 carbon atoms, aralkyl group having 7 to 30 carbon atoms, tetrahydrofurfuryl group and the like.

Illustrative examples of the (meth)acrylate compound represented by the above general formula (1) include alkyl (meth)acrylates such as methyl (meth)acrylate, ethyl (meth) acrylate, propyl (meth)acrylate, isopropyl (meth)acrylate, butyl (meth)acrylate, isobutyl (meth)acrylate, t-butyl (meth) acrylate, pentyl (meth)acrylate, amyl (meth)acrylate, isoamyl (meth)acrylate, hexyl (meth)acrylate, heptyl (meth) acrylate, octyl (meth)acrylate, isooctyl (meth)acrylate, ethylhexyl (meth)acrylate, nonyl (meth)acrylate, decyl (meth) acrylate, isodecyl (meth)acrylate, undecyl (meth)acrylate, dodecyl (meth)acrylate, lauryl (meth)acrylate, stearyl (meth) acrylate and isostearyl (meth)acrylate; hydroxyalkyl (meth) acrylates such as hydroxyethyl (meth)acrylate, 2-hydroxypropyl (meth)acrylate, 3-hydroxypropyl (meth) acrylate, 2-hydroxybutyl (meth)acrylate, 3-hydroxybutyl (meth)acrylate and 4-hydroxybutyl (meth)acrylate; phenoxyalkyl (meth)acrylates such as phenoxyethyl (meth) acrylate and 2-hydroxy-3-phenoxypropyl (meth)acrylate; alkoxyalkyl (meth)acrylates such as 2-methoxyethyl (meth) acrylate, 2-ethoxyethyl (meth)acrylate, 2-propoxyethyl (meth)acrylate, 2-butoxyethyl (meth)acrylate and 2-methoxybutyl (meth)acrylate; polyalkylene glycol (meth) acrylates such as polyethylene glycol mono(meth)acrylate, ethoxydiethylene glycol (meth)acrylate, methoxypolyethylene glycol (meth)acrylate, phenoxypolyethylene glycol (meth)acrylate, nonylphenoxypolyethylene glycol (meth) acrylate, polypropylene glycol mono(meth)acrylate, methoxypolypropylene glycol (meth)acrylate, ethoxypolypropylene glycol (meth)acrylate and nonylphenoxypolypropylene glycol (meth)acrylate; cycloalkyl (meth)acrylates such as cyclohexyl (meth)acrylate, 4-butylcyclohexyl (meth) acrylate, dicyclopentanyl (meth)acrylate, dicyclopentenyl (meth)acrylate, dicyclopentadienyl (meth)acrylate, bornyl (meth)acrylate, isobornyl (meth)acrylate and tricyclodecanyl (meth)acrylate; aralkyl (meth)acrylates such as benzyl (meth)acrylate; tetrahydrofurfuryl (meth)acrylate; and the like.

Of these, (meth)acrylate compounds in which the group represented by $R^2$ is a group containing an alkyl group or oxyalkylene group in the above general formula (1) are preferred. Particularly preferred (meth)acrylate compounds include methyl (meth)acrylate, butyl (meth)acrylate, ethylhexyl (meth)acrylate, lauryl (meth)acrylate, isodecyl (meth) acrylate and 2-ethoxyethyl (meth)acrylate.

The other copolymerizable monomer is not particularly limited as long as it is copolymerizable with the above (meth)acrylate compounds, as exemplified by unsaturated carboxylic acids such as (meth)acrylic acid, vinylbenzoic acid, maleic acid and vinylphthalic acid; and vinyl group-containing radical polymerizable compounds such as vinylbenzylmethyl ether, vinylglycidyl ether, styrene, α-methylstyrene, butadiene and isoprene.

In the acrylic resin forming the composition of the present invention, the proportion of polymer units derived from the (meth)acrylate compound represented by the above general formula (1) is generally 70 wt % or more, preferably 90 wt % or more, more preferably 100 wt %.

Further, the above acrylic resin preferably contains an acrylic resin having a hydrophilic functional group (to be referred to as "hydrophilic acrylic resin" hereinafter). The hydrophilic acrylic resin has excellent wettability (affinity) with glass powders having a hydrophilic surface. As the composition of the present invention containing a hydrophilic acrylic resin can disperse glass powders stably and does not produce agglomerates of the glass powders, the film forming material layer obtained is free from film defects and yet a glass sintered body having high light transmittance can be formed by baking the film forming material layer.

Illustrative examples of the "hydrophilic functional group" include a hydroxyl group; an alkoxyl group such as methoxyl group and ethoxyl group; a carboxyl group; a sulfonic acid group; and the like.

The hydrophilic acrylic resin is (1) a homopolymer of a (meth)acrylate having a hydrophilic functional group (to be referred to as "hydrophilic group-containing (meth)acrylate" hereinafter), (2) a copolymer of two or more hydrophilic group-containing (meth)acrylates, (3) a copolymer of at least one hydrophilic group-containing (meth)acrylate and at least one (meth)acrylate having no hydrophilic functional group, (4) a copolymer of at least one hydrophilic group-containing (meth)acrylate and at least one other copolymerizable unsaturated monomer, (5) a copolymer of at least one hydrophilic group-containing (meth)acrylate, at least one (meth)acrylate having no hydrophilic functional group and at least one other copolymerizable unsaturated monomer, or the like. The above copolymers (2) to (5) forming the hydrophilic acrylic resin may be either a random copolymer, block copolymer, graft copolymer or alternating copolymer.

Illustrative examples of the "hydrophilic group-containing (meth)acrylate" which is a monomer forming the hydrophilic acrylic resin include (meth)acrylates containing a hydroxyl group such as ethylene glycol monomethyl (meth)acrylate, ethylene glycol monoethyl (meth)acrylate and glycerol (meth)acrylate, in addition to the above hydroxyalkyl (meth)acrylates, alkoxyalkyl (meth)acrylates and polyalkylene glycol (meth)acrylates out of the (meth) acrylate compounds represented by the above general formula (1).

Illustrative examples of the "(meth)acrylate having no hydrophilic functional group" include dimethylaminoethyl (meth)acrylate, tetrahydrofurfuryl (meth)acrylate, (meth) acrylic acid amide, (meth)acrylonitrile, glycidyl (meth) acrylate, ethylene glycol di(meth)acrylate, triethylene glycol di(meth)acrylate, tetraethylene glycol di(meth)acrylate, butylene glycol di(meth)acrylate, propylene glycol di(meth) acrylate, 1,6-hexanediol di(meth)acrylate and the like, in addition to the above alkyl (meth)acrylates and cycloalkyl (meth)acrylates out of the (meth)acrylate compounds represented by the above general formula (1).

Illustrative examples of the "other copolymerizable unsaturated monomer" are the same as those listed for the other copolymerizable monomer of the above-described acrylic resin.

The binder resin forming the composition of the present invention preferably has a surface tension polar item value of 1 to 15 dyn/cm.

A binder resin having a surface tension polar item value of less than 1 dyn/cm exhibits hydrophobic nature and its wettability (affinity) with glass powders having a hydrophilic surface lowers. When this binder resin is used, it is difficult to prepare a composition having excellent dispersion stability for glass powders and film defects may be produced in the film forming material layer formed from the composition or a glass sintered body (dielectric layer) formed by baking the film forming material layer of the composition may not have sufficiently high light transmittance.

On the other hand, a resin having a surface tension polar item value of more than 15 dyn/cm exhibits extremely high hydrophilic nature. It is difficult to coat a glass paste composition containing this binder resin on a base film having a hydrophobic surface (such as a PET film subjected to a release treatment).

A glass paste composition obtained by setting the surface tension polar item value of the binder resin to 1 to 15 dyn/cm has dispersion stability for glass powders and excellent coating properties for a base film.

The surface tension polar item value of the binder resin can be adjusted by changing the kind and proportion of a monomer contained in the binder resin.

The surface tension (polar item+dispersion item) of the binder resin is preferably in the range of 30 to 50 dyn/cm.

The binder resin in the present invention must be able to bind glass powders by appropriate stickiness and to have excellent heat decomposability. The 80% weight reduction temperature of the binder resin is preferably 300° C. or lower and the 95% weight reduction temperature of the binder resin is preferably 350° C. or lower in order to form a glass sintered body (dielectric layer) containing no baked residues.

As for the molecular weight of the binder resin forming the composition of the present invention, the weight average molecular weight in terms of polystyrene measured by GPC is preferably 4,000 to 300,000, more preferably 10,000 to 200,000.

The proportion of the binder resin in the composition of the present invention is preferably 5 to 40 parts by weight, more preferably 10 to 30 parts by weight based on 100 parts by weight of the glass powders. When the proportion of the binder resin is too small, the glass powders cannot be bound and held securely, while when the proportion is too large, the baking step may take too long or the glass sintered body (dielectric layer) formed may not have a sufficient strength or thickness.

<solvent>

The present invention has a marked characteristic in that a specific solvent is contained as the solvent forming the composition of the present invention.

(1) The normal boiling point (boiling point at 1 atm.) of the specific solvent is 100 to 200° C., preferably 110 to 180° C.

When the normal boiling point of the specific solvent is higher than 200° C., the boiling point of the whole solvent contained becomes too high, whereby a large amount of an organic solvent remains in the film forming material layer of the obtained transfer film when the transfer film is produced by coating a glass paste composition containing such solvent and a blocking phenomenon is liable to occur when the transfer film is rolled up for preservation. On the other hand, when the normal boiling point of the specific solvent is lower than 100° C., the boiling point of the whole solvent becomes too low, whereby agglomerates of glass powders are apt to be produced in the glass paste composition containing such solvent and film defects such as striped coating traces, craters and pinholes tend to be produced in the film forming material layer formed by coating the composition.

(2) The vapor pressure at 200° C. of the specific solvent is 0.5 to 50 mmHg, preferably 0.7 to 30 mmHg.

When the vapor pressure at 20° C. of the specific solvent is lower than 0.5 mmHg, the vapor pressure of the whole solvent contained becomes too low, whereby a large amount of an organic solvent remains in the film forming material layer of the obtained transfer film when the transfer film is produced by coating a glass paste composition containing such solvent and a blocking phenomenon is liable to occur when the transfer film is rolled up for preservation. On the other hand, when the vapor pressure at 20° C. of the specific solvent is higher than 50 mmHg, the vapor pressure of the whole solvent becomes too high, whereby a glass paste composition containing the solvent has quick-drying properties and insufficient leveling properties at the time of coating. Thus, the uniformity in film thickness tends to deteriorate.

(3) The surface tension at 20° C. of the specific solvent is preferably 25 dyn/cm or more.

When the surface tension at 20° C. of the specific solvent is less than 25 dyn/cm, the surface tension of the whole solvent contained is low. When a film forming material layer is formed by coating a glass paste composition containing such solvent, a glass sintered body (dielectric layer) formed by baking the film forming material layer may be whitened and may not have sufficient transparency (light transmittance).

The specific solvent forming the composition of the present invention is selected from the group consisting of ketones, alcohols and esters which satisfy the above conditions (1) and (2), and preferably the above condition (3) as well.

Illustrative examples of the specific solvent include ketones such as diethyl ketone, methyl butyl ketone, dipropyl ketone, cyclohexanone; alcohols such as n-pentanol, 4-methyl-2-pentanol, cyclohexanol and diacetone alcohol; ether-based alcohols such as ethylene glycol monomethyl ether, ethylene glycol monoethyl ether, ethylene glycol monobutyl ether, propylene glycol monomethyl ether and propylene glycol monoethyl ether; saturated aliphatic alkyl monocarboxylates such as n-butyl acetate and amyl acetate; lactates such as ethyl lactate and n-butyl lactate; ether-based esters such as methyl cellosolve acetate, ethyl cellosolve acetate, propylene glycol monomethyl ether acetate and ethyl-3-ethoxypropionate; and the like. Of these, methyl butyl ketone, cyclohexanone, diacetone alcohol, ethylene glycol monobutyl ether, propylene glycol monomethyl ether, ethyl lactate and ethyl-3-ethoxypropionate are preferred. These specific solvents may be used alone or in combination of two or more.

A solvent other than the specific solvent, which may be contained in the composition of the present invention can be selected from (1) solvents having affinity (dispersibility) with glass powders, solubility of a binder resin and compatibility with the specific binder, (2) solvents which can provide appropriate viscosity to the glass paste composition together with the specific solvent, and (3) solvents which can be easily evaporated and removed by drying. Illustrative examples of the solvent include turpentine oil, ethyl cellosolve, methyl cellosolve, terpineol, butyl carbitol acetate, butyl carbitol, isopropyl alcohol, benzyl alcohol and the like.

The proportion of the specific solvent in the whole solvent in the composition of the present invention is generally 50 wt % or more, preferably 70 wt % or more.

The proportion of the solvent (the specific solvent and other solvent) in the composition of the present invention is preferably 5 to 50 parts by weight, more preferably 10 to 40 parts by weight, based on 100 parts by weight of the glass powders to maintain the viscosity of the composition in a favorable range.

A preferred example of the glass paste composition is a composition containing, as essential components, 100 parts by weight of glass powders comprising 50 to 80 wt % of lead oxide, 5 to 20 wt % of boron oxide and 10 to 30 wt % of silicon oxide as constituent components; 10 to 30 parts by weight of polybutyl methacrylate (acrylic resin); and 10 to 50 parts by weight of propylene glycol monomethyl ether (specific solvent).

<silane coupling agent>

The composition of the present invention may contain a silane coupling agent [saturated alkyl group-containing (alkyl)alkoxysilane] represented by the following formula (2). When a silane coupling agent is contained, not only the dispersion stability for glass powders of the obtained glass paste composition but also the flexibility of the film forming material layer formed is improved, and a transfer film can be obtained that hardly has cracks by bending on the surface of its film forming material layer.

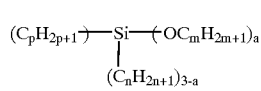

(2)

wherein p is an integer of 3 to 20, m is an integer of 1 to 3, n is an integer of 1 to 3, and a is an integer of 1 to 3.

In the above formula (2), p indicating the number of carbon atoms in the saturated alkyl group ($C_pH_{2p+1}$) is an integer of 3 to 20, preferably an integer of 4 to 16.

When a saturated alkyl group-containing (alkyl) alkoxysilane p of which is less than 3 is contained, the film forming material layer formed from the obtained glass paste composition does not exhibit sufficient flexibility. Meanwhile, a saturated alkyl group-containing (alkyl) alkoxysilane p of which is more than 20 has high decomposition temperature and the glass powders melt before the organic material (the above silane derivative) is fully decomposed and removed in the step of baking the film forming material layer formed from the obtained glass paste composition. Therefore, part of the organic material remains in the formed dielectric layer with the result that the light transmittance of the dielectric layer tends to lower.

Illustrative examples of the silane coupling agent represented by the above formula (2) include saturated alkyldimethyl methoxysilanes (a=1, m=1, n=1) such as n-propyldimethyl methoxysilane, n-butyldimethyl methoxysilane, n-decyldimethyl methoxysilane, n-hexadecyldimethyl methoxysilane and n-icosanedimethyl methoxysilane; saturated alkyldiethyl methoxysilanes (a=1, m=1, n=2) such as n-propyldiethyl methoxysilane, n-butyldiethyl methoxysilane, n-decyldiethyl methoxysilane, n-hexadecyldiethyl methoxysilane and n-icosanediethyl methoxysilane; saturated alkyldipropyl methoxysilanes (a=1, m=1, n=3) such as n-butyldipropyl methoxysilane, n-decyldipropyl methoxysilane, n-hexadecyldipropyl methoxysilane and n-icosanedipropyl methoxysilane; saturated alkyldimethyl ethoxysilanes (a=1, m=2, n=1) such as n-propyldimethyl ethoxysilane, n-butyldimethyl ethoxysilane, n-decyldimethyl ethoxysilane, n-hexadecyldimethyl ethoxysilane and n-icosanedimethyl ethoxysilane; saturated alkyldiethyl ethoxysilanes (a=1, m=2, n=2) such as n-propyldiethyl ethoxysilane, n-butyldiethyl ethoxysilane, n-decyldiethyl ethoxysilane, n-hexadecyldiethyl ethoxysilane and n-icosanediethyl ethoxysilane; saturated alkyldipropyl ethoxysilanes (a=1, m=2, n=3) such as n-butyldipropyl ethoxysilane, n-decyldipropyl ethoxysilane, n-hexadecyldipropyl ethoxysilane and n-icosanedipropyl ethoxysilane; saturated alkyldimethyl propoxysilanes (a=1, m=3, n=1) such as n-propyldimethyl propoxysilane, n-butyldimethyl propoxysilane, n-decyldimethyl propoxysilane, n-hexadecyldimethyl propoxysilane and n-icosanedimethyl propoxysilane; saturated alkyldiethyl propoxysilanes (a=1, m=3, n=2) such as n-propyldiethyl propoxysilane, n-butyldiethyl propoxysilane, n-decyldiethyl propoxysilane, n-hexadecyldiethyl propoxysilane and n-icosanediethyl propoxysilane; saturated alkyldipropyl propoxysilanes (a=1, m=3, n=3) such as n-butyldipropyl propoxysilane, n-decyldipropyl propoxysilane, n-hexadecyldipropyl propoxysilane and n-icosanedipropyl propoxysilane; saturated alkylmethyl dimethoxysilanes (a=2, m=1, n=1) such as n-propylmethyl dimethoxysilane, n-butylmethyl dimethoxysilane, n-decylmethyl dimethoxysilane, n-hexadecylmethyl dimethoxysilane and n-icosanemethyl dimethoxysilane; saturated alkylethyl dimethoxysilanes (a=2, m=1, n=2) such as n-propylethyl dimethoxysilane, n-butylethyl dimethoxysilane, n-decylethyl dimethoxysilane, n-hexadecylethyl dimethoxysilane and n-icosaneethyl dimethoxysilane; saturated alkylpropyl dimethoxysilanes (a=2, m=1, n=3) such as n-butylpropyl dimethoxysilane, n-decylpropyl dimethoxysilane, n-hexadecylpropyl dimethoxysilane and n-icosanepropyl dimethoxysilane; saturated alkylmethyl diethoxysilanes (a=2, m=2, n=1) such as n-propylmethyl diethoxysilane, n-butylmethyl diethoxysilane, n-decylmethyl diethoxysilane, n-hexadecylmethyl diethoxysilane and n-icosanemethyl diethoxysilane; saturated alkylethyl diethoxysilanes (a=2, m=2, n=2) such as n-propylethyl diethoxysilane, n-butylethyl diethoxysilane, n-decylethyl diethoxysilane, n-hexadecylethyl diethoxysilane and n-icosaneethyl diethoxysilane; saturated alkylpropyl diethoxysilanes (a=2, m=2, n=3) such as n-butylpropyl diethoxysilane, n-decylpropyl diethoxysilane, n-hexadecylpropyl diethoxysilane and n-icosanepropyl diethoxysilane; saturated alkylmethyl dipropoxysilanes (a=2, m=3, n=1) such as n-propylmethyl dipropoxysilane, n-butylmethyl dipropoxysilane, n-decylmethyl dipropoxysilane, n-hexadecylmethyl dipropoxysilane and n-icosanemethyl dipropoxysilane; saturated alkylethyl dipropoxysilanes (a=2, m=3, n=2) such as n-propylethyl dipropoxysilane, n-butylethyl dipropoxysilane, n-decylethyl dipropoxysilane, n-hexadecylethyl dipropoxysilane and n-icosaneethyl dipropoxysilane; saturated alkylpropyl dipropoxysilanes (a=2, m=3, n=3) such as n-butylpropyl dipropoxysilane, n-decylpropyl dipropoxysilane, n-hexadecylpropyl dipropoxysilane and n-icosanepropyl dipropoxysilane; saturated alkyl trimethoxysilanes (a=3, m=1) such as n-propyl trimethoxysilane, n-butyl trimethoxysilane, n-decyl trimethoxysilane, n-hexadecyl trimethoxysilane and n-icosane trimethoxysilane; saturated alkyl triethoxysilanes (a=3, m=2) such as n-propyl triethoxysilane, n-butyl triethoxysilane, n-decyl triethoxysilane, n-hexadecyl triethoxysilane and n-icosane triethoxysilane; saturated alkyl tripropoxysilanes (a=3, m=3) such as n-propyl tripropoxysilane, n-butyl tripropoxysilane, n-decyl tripropoxysilane, n-hexadecyl tripropoxysilane and n-icosane tripropoxysilane; and the like. These silane coupling agents may be used alone or in combination of two or more.

Of these, n-butyl trimethoxysilane, n-decyl trimethoxysilane, n-hexadecyl trimethoxysilane, n-decyldimethyl methoxysilane, n-hexadecyldimethyl methoxysilane, n-butyl triethoxysilane, n-decyl triethoxysilane, n-hexadecyl triethoxysilane, n-decyl triethoxysilane, n-hexadecyl triethoxysilane, n-decylethyl diethoxysilane, n-hexadecylethyl diethoxysilane, n-butyl tripropoxysilane, n-decyl tripropoxysilane and n-hexadecyl tripropoxysilane are particularly preferred.

The proportion of the silane coupling agent represented by the above formula (2) in the composition of the present invention is preferably 0.001 to 10 parts by weight, more preferably 0.001 to 5 parts by weight based on 100 parts by weight of the glass powders. When the proportion of the silane coupling agent is too small, its effect of improving both the dispersion stability for the glass powders and the flexibility of the formed film forming material layer cannot be fully exhibited. On the other hand, when the proportion is too large, the viscosity of the obtained glass paste composition increases with the passage of time when the composition is preserved or a reaction between silane coupling agents occurs, which may cause a reduction in light transmittance after baking.

<polypropylene glycol>

The composition of the present invention may contain polypropylene glycol. When polypropylene glycol is contained in the composition, it is possible to cause the film forming material layer formed to exhibit high flexibility. In addition, polypropylene glycol, unlike a general plasticizer such as dioctyl phthalate, does not reduce the film strength of the film forming material layer formed and the light transmittance of the dielectric layer obtained by baking the film forming material layer.

The weight average molecular weight (Mw) of the polypropylene glycol is preferably in the range of 200 to 3,000, particularly preferably 300 to 2,000. The weight average molecular weight (Mw) is a weight average molecular weight in terms of polystyrene measured by gel permeation chromatography (GPC) (the same shall apply hereinafter).

When the weight average molecular weight (Mw) of polypropylene glycol is less than 200, a film forming material layer having high film strength cannot be formed on a base film and the film forming material layer may cause a cohesive failure when the base film is peeled off from the film forming material layer heat bonded to the glass substrate in the transfer step which is carried out using a transfer film comprising the film forming material layer.

On the other hand, when the weight average molecular weight (Mw) of polypropylene glycol is more than 3,000, it is difficult to form a film forming material layer having good heat adhesion to the glass substrate.

The proportion of polypropylene glycol in the composition of the present invention is preferably 0.1 to 20 parts by weight, more preferably 0.5 to 10 parts by weight, based on 100 parts by weight of the glass powders. When the proportion of the polypropylene glycol is too small, its effect of improving the flexibility of the film forming material layer is hardly exhibited. When the proportion is too large and a transfer film is formed from the obtained glass paste composition, a blocking phenomenon occurs and the transfer film can be hardly unrolled.

The glass paste composition of the present invention may optionally contain various additives such as a dispersant, stickiness providing agent, plasticizer, surface tension control agent, stabilizer and anti-foaming agent in addition to the above components.

The composition of the present invention can be prepared by kneading the above glass powders, binder resin, solvent and optional components as required by a kneader such as a roll kneader, mixer, homo-mixer, ball mill or bead mill.

The composition of the present invention thus prepared is a paste composition having fluidity suitable for coating and preferably has a viscosity of 1,000 to 30,000 cp, more preferably 3,000 to 10,000 cp.

The composition of the present invention can be advantageously used for the production of a transfer film. This transfer film is a composite film comprising a base film and a film forming material layer formed on the base film and used in a dry film process.

The base film forming the transfer film is preferably a resin film having heat resistance, solvent resistance as well as flexibility. Owing to the flexibility of the base film, the composition of the present invention can be coated by a roll coater, a blade coater or the like, and a roll of the film forming material layer can be preserved and supplied. Illustrative examples of the resin forming the base film include polyesters such as polyethylene terephthalate, polyethylenes, polypropylenes, polystyrenes, polyimides, polyvinyl alcohols, polyvinyl chlorides, fluorine-containing resins such as polyfluoroethylene, polyamides, celluloses and the like. The base film preferably has a thickness of 20 to 100 $\mu$m, for example.

The film forming material layer forming the transfer film can be formed by coating the composition of the present invention on the base film and drying the coating film to remove part and all of the solvent (for example, removing it until the content of the solvent becomes 0 to 1.0 wt %). The film forming material layer can be made as thick as 5 to 50 $\mu$m in a dry state.

The method of coating the composition of the present invention on the base film preferably is a method that allows to form a coating film having a uniform and large thickness (for example, 20 $\mu$m or more) efficiently. Specifically, the composition of the present invention is preferably coated with a roll coater, blade coater, curtain coater or wire coater.

The surface of the base film to be coated with the composition of the present invention is preferably subjected to a release treatment. This makes it easy to carry out the operation of separating the base film in the step of transferring to the glass substrate.

A protective film layer may be formed on the surface of the film forming material layer of the transfer film. The protective film layer is a polyethylene terephthalate film, polyethylene film, polyvinyl alcohol film or the like.

The film forming material layer (film forming material layer forming the transfer film) formed by coating the composition of the present invention on the base film has excellent flexibility (rollability) and excellent adhesion to the glass substrate because it contains an acrylic resin.

The composition of the present invention can be advantageously used to produce a transfer film by forming the film forming material layer on the base film as described above. The composition of the present invention is not limited to this application but it also can be advantageously used in a conventionally known method of forming a film forming material layer, that is, a method of forming a film forming material layer by directly coating the composition on the surface of a glass substrate by a screen printing or the like and drying the coating film.

The following examples are given to further illustrate the present invention. However, it should be understood that the present invention is not limited by these examples. "Parts" means "parts by weight" in the following examples.

EXAMPLE a1

(1) Preparation of Glass Paste Composition:

100 Parts of a $PbO$—$B_2O_3$—$SiO_2$ mixture (softening point of 550° C.) comprising 60 wt % of lead oxide, 10 wt % of boron oxide and 30 wt % of silicon oxide as glass powders, 20 parts of an acrylic resin obtained by copolymerizing butyl methacrylate (70 wt %) and methyl methacrylate (30 wt %) and having a weight average molecular weight in terms of polystyrene measured by GPC: 80,000 (to be referred to as "acrylic resin A" hereinafter) as a binder resin and 20 parts of methyl butyl ketone (specific solvent) as a solvent were kneaded using a dispersing machine to prepare the composition of the present invention having a viscosity of 7,000 cp.

(2) Production of Transfer Film:

The composition of the present invention prepared in (1) above was coated on a polyethylene terephthalate (PET) base film (400 mm wide, 30 m long and 38 $\mu$m thick), which had been subjected to a release treatment in advance, with a blade coater, and the formed coating film was dried at 100° C. for 5 minutes to remove the solvent to produce a transfer film comprising a 50 $\mu$m thick film forming material layer formed on the base film.

(3) Evaluation of Transfer Film:

When the content of the solvent (methyl butyl ketone) remaining in the film forming material layer of the transfer film produced in (2) above was determined by a gas chromatography, it was found to be 1 wt % or less and stickiness on the surface of the film forming material layer was not observed. When the surface condition of this film forming material layer was observed under a microscope, agglomerates of the glass powders and film defects such as striped coating traces, craters and pinholes were not observed at all. Further, the transfer film was cut into ten 10 cm×10 cm test pieces which were then joined together to prepare a laminate. After this laminate was left, under a compression load (20 gf/cm$^2$) applied to both surfaces of the laminate, in a constant-temperature and constant-moisture atmosphere (temperature of 40° C., relative humidity of 60%) for 24 hours, the test pieces were separated from the laminate one by one. They could be easily separated and a blocking phenomenon was not observed.

(4) Transfer of Film Forming Material Layer:

The transfer film produced in (2) above was placed on the surface (bus electrode fixed surface) of a glass substrate for a 20 inch panel in such a manner that the surface of the film forming material layer was in close contact with the surface of the glass substrate, and thermally contact-bonded by a heating roll. The contact-bonding conditions are a heating roll surface temperature of 110° C., a roll pressure of 3 kg/cm$^2$ and a heating roll moving speed of 1 m/min.

After heat contact-bonding, the base film was peeled off and removed from the film forming material layer. Thereby, the film forming material layer was transferred and closely contacted to the surface of the glass substrate.

(5) Baking of Film Forming Material Layer (formation of dielectric layer):

The glass substrate to which the film forming material layer was transferred in (4) above was placed in a kiln, the temperature inside the kiln was raised from normal temperature to 560° C. at a rate of 10° C./min, and the glass substrate was baked at 560° C. for 30 minutes to form a dielectric layer composed of a glass sintered body on the surface of the glass substrate.

(6) Evaluation of Dielectric Layer:

When the thickness of the dielectric layer (average film thickness and tolerance) was measured, it was found to be 30 $\mu$m±0.5 $\mu$m. Therefore, the dielectric layer has excellent uniformity in thickness.

When five panel materials comprising a glass substrate having a dielectric layer were fabricated and the light transmittance of the formed dielectric layer (measurement wavelength of 600 nm) was measured, it was found that the light transmittance was 80% and the dielectric layer had excellent transparency.

EXAMPLES a2 TO a4

The glass paste compositions of the present invention were each prepared in the same manner as in Example a1 except that the composition of the solvent was changed according to formulation shown in Table 1.

A transfer film was produced in the same manner as in Example a1 except that each of the obtained glass paste compositions was used.

Thereafter, the transfer and baking of the film forming material layer were carried out in the same manner as in Example a1 except that each of the obtained transfer films was used, to form a dielectric layer (thickness of 30 $\mu$m±0.5 $\mu$m) on the surface of the glass substrate.

The evaluation results of the transfer films (the content of a solvent in the film forming material layer, stickiness on the surface of the film forming material layer, the blocking phenomenon of the transfer film, the existence of film defects in the film forming material layer) and the light transmittance of the formed dielectric layer are shown in Table 1.

COMPARATIVE EXAMPLE 1

According to formulation shown in Table 1, a glass paste composition for comparison was prepared in the same manner as in Example a1 except that 20 parts of isopropyl alcohol was used in place of methyl butyl ketone (specific solvent), and a transfer film was produced using the resulting glass paste composition.

In the obtained transfer film, the content of the solvent (isopropyl alcohol) in the film forming material layer was 1 wt % or less and stickiness on the surface of the film forming material layer was not observed. In the laminate of the transfer film, a blocking phenomenon was not observed. However, a large number of glass agglomerates as large as 20 to 50 μm were observed on the surface of the film forming material layer and striped coating traces and craters produced around the agglomerates were seen.

Thereafter, the transfer and banking of the film forming material layer were carried out in the same manner as in Example a1 except that the transfer film was used, to form a dielectric layer (thickness of 30 μm±1.5 μm) on the surface of the glass substrate. When the light transmittance of the dielectric layer was measured, it was found to be 50%. Therefore, the dielectric layer was inferior in transparency.

The above results are shown in Table 1.

When the surface condition of the film forming material layer of the obtained transfer film was observed, agglomerates of glass powders and film defects such as striped coating traces, craters and pinholes were not observed.

However, the content of the solvent (diethylene glycol monobutyl ether) in the film forming material layer was as high as 11 wt % and stickiness was observed on the entire surface of the film forming material layer. A test piece could not be peeled off from the laminate of the transfer film that was produced to check the existence of a blocking phenomenon.

Thereafter, a dielectric layer (thickness of 30 μm±0.5 μm) was formed on the surface of the glass substrate by carrying out the transfer and baking of the film forming material layer in the same manner as in Example a1 except that the transfer film was used and the light transmittance of the dielectric layer was measured. It was found to be 82%.

The above results are shown in Table 1.

TABLE 1

| | | Solvent | | | | |
|---|---|---|---|---|---|---|
| | Kind | Normal boiling point (° C.) | Vapor pressure at 20° C. (mmHg) | Surface tension at 20° C. (dyn/cm) | Amount used (part) | Viscosity of composition (cp) |
| Ex. a1 | Methyl butyl ketone (specific solvent) | 127 | 3.0 | 25.3 | 20 | 7,000 |
| Ex. a2 | Propylene glycol monomethyl ether (specific solvent) | 118 | 7.6 | 27.1 | 20 | 5,000 |
| Ex. a3 | Ethyl lactate (specific solvent) | 155 | 2.09 | 29.2 | 20 | 9,000 |
| Ex. a4 | Propylene glycol monomethyl ether (specific solvent) | 118 | 7.6 | 27.1 | 16 | 4,300 |
| | Isopropyl alcohol | 82 | 32.4 | 21.7 | 4 | |
| C. Ex. 1 | Isopropyl alcohol | 82 | 32.4 | 21.7 | 20 | 3,500 |
| C. Ex. 2 | Diethylene glycol monobutyl ether | 230 | 0.01 | 33.6 | 20 | 10,000 |

| | Evaluations of transfer film | | | | |
|---|---|---|---|---|---|
| | Content of solvent in film forming material layer (%) | stickiness on the surface of film forming material layer | Blocking phenomenon | Film defects of film forming material layer | Light transmittance of dielectric layer (%) |
| Ex. a1 | 1 or less | Non-existent | Non-existent | Non-existent | 80 |
| Ex. a2 | 1 or less | Non-existent | Non-existent | Non-existent | 80 |
| Ex. a3 | 1 or less | Non-existent | Non-existent | Non-existent | 82 |
| Ex. a4 | 1 or less | Non-existent | Non-existent | Non-existent | 78 |
| C. Ex. 1 | 1 or less | Non-existent | Non-existent | Existent | 50 |
| C. Ex. 2 | 11 | Existent on the whole | Existent | Non-existent | 82 |

Ex.: Example;
C. Ex.: Comparative Example

COMPARATIVE EXAMPLE 2

According to formulation shown in Table 1, a glass paste composition for comparison was prepared in the same manner as in Example a1 except that 20 parts of diethylene glycol monobutyl ether was used in place of methyl butyl ketone (specific solvent), and a transfer film was produced using the resulting glass paste composition.

EXAMPLE b1

(1) Preparation of Glass Paste Composition:

100 Parts of a PbO—B$_2$O$_3$—SiO$_2$ mixture (softening point of 550° C.) comprising 60 wt % of lead oxide, 10 wt % of boron oxide and 30 wt % of silicon oxide as glass powders, 23 parts of a hydrophilic acrylic resin (weight average molecular weight in terms of polystyrene measured by GPC: 85,000, surface tension: 35 dyn/cm, surface tension polar item: 3 dyn/cm) obtained by copolymerizing butyl methacrylate (90 wt %) and 2-hydroxypropyl methacrylate (10 wt %) as a binder resin and 20 parts of propylene glycol monomethyl ether (specific solvent) as a solvent were kneaded using a dispersing machine to prepare the composition of the present invention having a viscosity of 4,500 cp.

(2) Production of Transfer Film (evaluation of coating properties):

When the composition of the present invention prepared in (1) above was coated on a polyethylene terephthalate (PET) base film (400 mm wide, 30 m long and 38 μm thick), which had been subjected to a release treatment in advance, using a roll coater, a uniform coating film could be formed on the entire surface of the base film. Thereafter, the formed coating film was dried at 100° C. for 5 minutes to remove the solvent, and a transfer film having a 30 μm-thick film forming material layer formed on the base film was thereby produced.

(3) Evaluation of Transfer Film:

When the surface condition of the film forming material layer of the transfer film produced in (2) above was observed under a microscope, agglomerates of glass powders and film defects such as striped coating traces, craters and pinholes were not observed.

(4) Transfer of Film Forming Material Layer:

The transfer film produced in (2) above was placed upon the surface (bus electrode fixed surface) of a glass substrate for a 20 inch panel in such a manner that the surface of the film forming material layer was in close contact with the surface of the glass substrate and thermally contact-bonded by a heating roll. The contact-bonding conditions are a heating roll surface temperature of 110° C., a roll pressure of 3 kg/cm² and a heating roll moving speed of 1 m/min.

After heat contact-bonding, the base film was peeled off and removed from the film forming material layer. Thereby, the film forming material layer was transferred and closely contacted to the surface of the glass substrate.

(5) Baking of Film Forming Material Layer (formation of dielectric layer):

The glass substrate to which the film forming material layer was transferred in (4) above was placed in a kiln, the temperature inside the kiln was raised from normal temperature to 570° C. at a rate of 10° C./min, and the glass substrate was baked at 570° C. for 30 minutes to form a dielectric layer composed of a glass sintered body on the surface of the glass substrate.

(6) Evaluation of Dielectric Layer:

When the thickness of the dielectric layer (average film thickness and tolerance) was measured, it was found to be 15 μm±1 μm. Therefore, the dielectric layer was uniform in thickness.

When five panel materials comprising a glass substrate having a dielectric layer were fabricated and the light transmittance of the formed dielectric layer (measurement wavelength of 600 nm) was measured, it was found to be 83 to 86%. Therefore, the dielectric layer had excellent transparency.

The above results are shown in Table 2.

EXAMPLES b2 TO b5

The glass paste compositions of the present invention were each prepared in the same manner as in Example b1 except that the acrylic resin (constituent monomers) was changed according to formulation shown in Table 2.

A transfer film was produced in the same manner as in Example b1 except that each of the obtained glass paste compositions was used.

Thereafter, the transfer and baking of the film forming material layer were carried out in the same manner as in Example b1 except that each of the obtained transfer films was used, to form a dielectric layer (thickness of 15 μm±1 μm) on the surface of a glass substrate for a 20-inch panel.

Each of the compositions of Examples b2 to b5 was evaluated for (1) its coating properties on the base film, (2) the surface condition of the film forming material layer formed from the composition, and (3) the transferability (heat adhesion to the glass substrate) of the film forming material layer, and measured for (4) the light transmittance of the formed dielectric layer.

The coating properties on the base film were evaluated as good when the composition was not repelled on the surface of the base film and a uniform coating film could be formed on the entire surface. The surface condition of the film forming material layer was evaluated as "good" when agglomerates of glass powders and film defects such as striped coating traces, craters and pinholes were not observed. The transfer properties of the film forming material layer were evaluated as "good" when all the film forming material layer was transferred and closely contacted to the surface of the glass substrate. The above results are shown in Table 2.

TABLE 2

| | | (Hydrophilic) acrylic resin | | | | |
| --- | --- | --- | --- | --- | --- | --- |
| | Constituent monomers | Copolymer Weight ratio | Weight average molecular weight (Mw) | Surface tension (dyn/cm) | Polar item of surface tension (dyn/cm) | Amount used (part) |
| Ex. b1 | Butyl methacrylate | 90 | 85,000 | 35 | 3 | 23 |
| | 2-Hydroxypropyl methacrylate | 10 | | | | |
| Ex. b2 | Butyl methacrylate | 60 | 86,000 | 34 | 2 | 23 |
| | 2-Ethylhexyl methacrylate | 30 | | | | |

TABLE 2-continued

|  |  |  |  |  |  |  |
|---|---|---|---|---|---|---|
|  | 2-Hydroxypropyl methacrylate | 10 |  |  |  |  |
| Ex. b3 | Butyl methacrylate | 50 | 72,000 | 36 | 6 | 23 |
|  | Methoxyethyl methacrylate | 50 |  |  |  |  |
| Ex. b4 | Butyl methacrylate | 30 | 75,000 | 35 | 9 | 23 |
|  | Ethoxyethyl methacrylate | 60 |  |  |  |  |
|  | 2-Hydroxypropyl methacrylate | 10 |  |  |  |  |
| Ex. b5 | Methoxyethyl methacrylate | 80 | 90,000 | 52 | 14 | 23 |
|  | 2-Hydroxypropyl methacrylate | 20 |  |  |  |  |

|  | Viscosity of Composition (cp) | Coating properties of composition | Evaluations of transfer film | | Light transmittance of dielectric layer (%) |
|---|---|---|---|---|---|
|  |  |  | Surface condition of film forming material layer | Transferability of film forming material layer |  |
| Ex. b1 | 4,500 | Good | Good | Good | 83~86 |
| Ex. b2 | 3,900 | Good | Good | Good | 84~86 |
| Ex. b3 | 3,000 | Good | Good | Good | 80~84 |
| Ex. b4 | 3,100 | Good | Good | Good | 81~83 |
| Ex. b5 | 3,200 | Slightly*[1] difficult | Good | Good | 80~83 |

*[1]The composition was repelled on the surface of the base film and its coating step took long.
Ex.: Example

EXAMPLE c1

(1) Preparation of Glass Paste Composition:

100 Parts of a PbO—$B_2O_3$—$SiO_2$ mixture (softening point of 500° C.) comprising 70 wt % of lead oxide, 10 wt % of boron oxide and 20 wt % of silicon oxide as glass powders, 20 parts of the acrylic resin A used in Example a1 as a binder resin, 1 part of n-butyl trimethoxysilane as a silane coupling agent and 20 parts of propylene glycol monomethyl ether (specific solvent) as a solvent were kneaded using a dispersing machine to prepare the composition of the present invention having a viscosity of 5,000 cp.

(2) Evaluation of Preservation Stability of Composition:

The composition of the present invention prepared in (1) above was placed in a container, and the container was left in a constant temperature bath at 40° C. for 30 days. Thereafter, when a bottom portion of the container was observed, a cake-like deposit was rarely seen. Therefore, this composition was excellent in preservation stability.

(3) Production of Transfer Film:

The composition of the present invention prepared in (1) above was coated on a polyethylene terephthalate (PET) base film (400 mm wide, 30 m long and 38 μm thick), which had been subjected to a release treatment in advance, using a blade coater, the formed coating film was dried at 100° C. for 5 minutes to remove the solvent, and a transfer film having a 50 μm-thick film forming material layer formed on the base film was thereby produced.

(4) Evaluation of Transfer Film:

When the surface condition of the film forming material layer of the transfer film produced in (3) above was observed under a microscope, agglomerates of glass powders and film defects such as striped coating traces, craters and pinholes were not observed.

Even when the transfer film was bent, a crack (flex crack) was not produced in the surface of the film forming material layer. Therefore, the film forming material layer had excellent flexibility.

(5) Transfer of Film Forming Material Layer:

The transfer film was placed on the surface (bus electrode fixed side) of a glass substrate for a 20 inch panel in such a manner that the surface of the film forming material layer was in close contact with the surface of the glass substrate and thermally contact-bonded by a heating roll. The contact-bonding conditions are a heating roll surface temperature of 110° C., a roll pressure of 3 kg/cm² and a heating roll moving speed of 1 m/min.

After thermal contact-bonding, the base film was peeled off and removed from the film forming material layer. Thereby, the film forming material layer was transferred and closely contacted to the surface of the glass substrate.

(6) Baking of Film Forming Material Layer (formation of dielectric layer):

The glass substrate to which the film forming material layer was transferred in (5) above was placed in a kiln and the temperature in the kiln was raised from normal temperature to 550° C. at a rate of 10° C./min, and the glass substrate was baked at 550° C. for 30 minutes to form a dielectric layer composed of a glass sintered body on the surface of the glass substrate.

(7) Evaluation of Dielectric Layer:

When the thickness of the dielectric layer (average film thickness and tolerance) was measured, it was found to be 30 μm±0.5 μm. Therefore, the dielectric layer was uniform in thickness.

When five panel materials comprising a glass substrate having a dielectric layer were fabricated and the light transmittance of the formed dielectric layer (measurement wavelength of 600 nm) was measured, it was found that the light transmittance was 92% and the dielectric layer had excellent transparency.

EXAMPLES c2 TO c9

The glass paste compositions of the present invention were each prepared in the same manner as in Example c1 except that the silane coupling agent was changed according to formulation shown in Table 3.

A transfer film was then produced in the same manner as in Example c1 except that each of the obtained glass paste compositions was used.

Thereafter, the transfer and baking of the film forming material layer were carried out in the same manner as in Example c1 except that each of the obtained transfer films was used, to form a dielectric layer (thickness of 30 μm±0.5 μm) on the surface of a glass substrate for a 20-inch panel.

Each of the compositions of Examples c2 to c9 was evaluated for (1) its preservation stability (existence of a cake-like deposit in the bottom portion of the container), (2) the surface condition of the film forming material layer formed from the composition (existence of agglomerates of glass powders and film defects such as striped coating traces, craters and pinholes), (3) the flexibility of the film forming material layer (existence of cracks at the time of bending), and (4) the transfer properties of the film forming material layer (heat adhesion to the glass substrate) and measured for (5) the light transmittance of the formed dielectric layer. The results are shown in Table 3.

EXAMPLE d1

(1) Preparation of Glass Paste Composition:

100 Parts of a $PbO$—$B_2O_3$—$SiO_2$ mixture (softening point of 500° C.) comprising 70 wt % of lead oxide, 10 wt % of boron oxide and 20 wt % of silicon oxide as glass powders, 20 parts of polybutyl methacrylate (weight average molecular weight: 50,000) as a binder resin, 1 part of polypropylene glycol (weight average molecular weight: 400) as an additive and 20 parts of propylene glycol monomethyl ether (specific solvent) as a solvent were kneaded using a dispersing machine to prepare the composition of the present invention having a viscosity of 4,000 cp.

(2) Production of Transfer Film:

The composition of the present invention prepared in (1) above was coated on a polyethylene terephthalate (PET) base film (400 mm wide, 30 m long and 38 μm thick), which had been subjected to a release treatment in advance, using a blade coater, the formed coating film was dried at 100° C. for 5 minutes to remove the solvent, and a transfer film having a 50 μm-thick film forming material layer formed on the base film was thereby produced.

This transfer film had flexibility and could be rolled. When this transfer film was bent, a crack (flex crack) was not

TABLE 3

| | Kind of binder resin | Silane coupling agent Kind | General formula (1) p | a | m | n | Amount used (part) | Viscosity of composition (cp) |
|---|---|---|---|---|---|---|---|---|
| Ex. c1 | Acrylic resin A | n-butyl trimethoxysilane | 4 | 3 | 1 | — | 1 | 5,000 |
| Ex. c2 | Acrylic resin A | n-decyl trimethoxysilane | 10 | 3 | 1 | — | 1 | 7,000 |
| Ex. c3 | Acrylic resin A | n-hexadecylmethyl dimethoxysilane | 16 | 2 | 1 | 1 | 0.5 | 9,500 |
| Ex. c4 | Acrylic resin A | n-butyl triethoxysilane | 4 | 3 | 2 | — | 1 | 4,000 |
| Ex. c5 | Acrylic resin A | n-decyl triethoxysilane | 10 | 3 | 2 | — | 1 | 5,500 |
| Ex. c6 | Acrylic resin A | n-hexadecylethyl diethoxysilane | 16 | 2 | 2 | 2 | 0.5 | 6,500 |
| Ex. c7 | Acrylic resin A | n-butyl tripropoxysilane | 4 | 3 | 3 | — | 1 | 5,000 |
| Ex. c8 | Acrylic resin A | n-decyl tripropoxysilane | 10 | 3 | 3 | — | 1 | 6,500 |
| Ex. c9 | Acrylic resin A | n-hexadecylpropyl dipropoxysilane | 16 | 2 | 3 | 3 | 0.5 | 7,500 |

| | Evaluations of transfer film | | | | |
|---|---|---|---|---|---|
| | Preservation stability of composition | Surface condition of film forming material layer | Flexibility of film forming material layer | Transferability of film forming material layer | Light transmittance of dielectric layer (%) |
| Ex. c1 | Good | Good | Good | Good | 92 |
| Ex. c2 | Good | Good | Good | Good | 91 |
| Ex. c3 | Good | Good | Good | Good | 89 |
| Ex. c4 | Good | Good | Good | Good | 92 |
| Ex. c5 | Good | Good | Good | Good | 90 |
| Ex. c6 | Good | Good | Good | Good | 88 |
| Ex. c7 | Good | Good | Good | Good | 91 |
| Ex. c8 | Good | Good | Good | Good | 90 |
| Ex. c9 | Good | Good | Good | Good | 87 |

Ex.: Example produced in the surface of the film forming material layer. Therefore, the film forming material layer had excellent flexibility.

(3) Transfer of Film Forming Material Layer:

The transfer film was placed on the surface (bus electrode fixed side) of a glass substrate for a 20 inch panel in such a manner that the surface of the film forming material layer was in close contact with the surface of the glass substrate, and thermally contact-bonded by a heating roll. The contact-bonding conditions are a heating roll surface temperature of 110° C., a roll pressure of 3 kg/cm$^2$ and a heating roll moving speed of 1 m/min.

After thermal contact-bonding, the base film was peeled off and removed from the film forming material layer fixed (thermally bonded) to the surface of the glass substrate to complete the transfer of the film forming material layer.

When the base film was peeled off in the transfer step, the film forming material layer did not cause a cohesive failure. Therefore, the film forming material layer had sufficiently high film strength. Further, the transferred film forming material layer had excellent adhesion to the surface of the glass substrate.

(4) Baking of Film Forming Material Layer (formation of dielectric layer):

The glass substrate to which the film forming material layer was transferred in (3) above was placed in a kiln and the temperature in the kiln was raised from normal temperature to 550° C. at a rate of 10° C./min, and the glass substrate was baked at 550° C. for 30 minutes to form an achromatic dielectric layer composed of a glass sintered body on the surface of the glass substrate.

When the thickness (average film thickness and tolerance) of the dielectric layer was measured, it was found to be 30 μm±0.4 μm. Therefore, the dielectric layer was uniform in thickness.

When five panel materials comprising a glass substrate having a dielectric layer were fabricated and the light transmittance of the formed dielectric layer (measurement wavelength of 600 nm) was measured, it was found that the light transmittance was 95% and the dielectric layer had excellent transparency.

The above results are shown in Table 4.

EXAMPLES d2 AND d3

The glass paste compositions of the present invention were each prepared in the same manner as in Example d1 except that polypropylene glycol having a weight average molecular weight different from that of Example d1 was used as an additive according to formulation shown in Table 4.

A transfer film was then produced in the same manner as in Example b1 except that each of the obtained glass paste compositions was used.

Thereafter, the transfer and baking of the film forming material layer were carried out in the same manner as in Example d1 except that each of the obtained transfer films was used, to form an achromatic dielectric layer (thickness of 30 μm±0.5 μm) on the surface of a glass substrate for a 20-inch panel.

Each of the film forming material layers (film forming material layer forming the transfer film) formed from the compositions of Examples d2 and d3 was evaluated for its flexibility, film strength and adhesion to the glass substrate and measured for (4) the light transmittance of the formed dielectric layer.

The flexibility was evaluated as "good" when a flex crack was not produced in the surface of the film forming material layer by bending the transfer film.

The film strength was evaluated as "good" when the film forming material layer did not cause a cohesive failure at the time of peeling off the base film.

The adhesion to the glass substrate was evaluated as good when interface peeling between the surface of the glass substrate and the film forming material layer did not occur by removing the base film (when interface peeling did not occur in all areas where the dielectric layer should be formed).

These results are shown in Table 4.

TABLE 4

| | Kind of binder resin | Additive Kind | Weight average molecular weight (Mw) | Amount used (part) | Viscosity of composition (cp) |
|---|---|---|---|---|---|
| Ex. d1 | Polybutyl methacrylate | Polypropylene glycol | 400 | 1 | 4,000 |
| Ex. d2 | Polybutyl methacrylate | Polypropylene glycol | 1,000 | 3 | 5,500 |
| Ex. d3 | Polybutyl methacrylate | Polypropylene glycol | 2,000 | 5 | 6,700 |

| | Evaluations of film forming material layer forming transfer film | | | |
|---|---|---|---|---|
| | Flexibility | Film strength | Adhesion to glass substrate | Light transmittance of dielectric layer (%) |
| Ex. d1 | Good | Good | Good | 95 |
| Ex. d2 | Good | Good | Good | 93 |
| Ex. d3 | Good | Good | Good | 92 |

Ex.: Example

The following effects are provided by the composition of the present invention.

(1) A film forming material layer having a low content of a solvent can be formed by a low-temperature and short-time drying.

(2) Since a specific solvent having affinity with glass powders is contained, agglomerates of the glass powders are not produced in the composition.

(3) A film forming material layer having excellent homogeneity without film defects can be formed.

(4) A film forming material layer having excellent flexibility can be formed.

(5) A film forming material layer having excellent adhesion to a glass substrate can be formed.

(6) A dielectric layer having high light transmittance can be formed.

(7) The composition of the present invention can be advantageously used for the production of a transfer film.

(8) A transfer film having excellent blocking resistance can be produced.

(9) A transfer film having excellent rollability can be produced.

What is claimed is:

1. A glass paste composition comprising:
   (A) glass powders;
   (B) a binder resin, said binder resin being an acrylic resin containing a polymerized unit derived from a compound represented by the following formula (1):

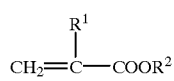

wherein $R^1$ is a hydrogen atom or a methyl group, and $R^2$ is a monovalent organic group, provided that at least part of the compound represented by the above formula (1) is an acrylate having a hydrophillic functional group; and
   (C) at least one organic solvent selected from the group consisting of a ketone, an alcohol and an ester which satisfy the following conditions (1) and (2):
   condition (1): the normal boiling point is 100 to 200° C., and
   condition (2): the vapor pressure at 20° C. is 0.5 to 50 mmHg.

2. The glass paste composition of claim 1, wherein the glass powders have an average particle diameter of 0.3 to 3.0 μm.

3. The glass paste composition of claim 1, wherein the acrylic resin is a homopolymer of the compound represented by the above formula (1), a copolymer of two or more compounds represented by the above formula (1), or a copolymer of the compound represented by the above formula (1) and other monomer copolymerizable with said compound.

4. The glass paste composition of claim 1, wherein the binder resin (B) has a surface tension polar item value of 1 to 15 dyn/cm.

5. The glass paste composition of claim 1, wherein the binder resin (B) has a 95% weight reduction temperature of 350° C. or lower.

6. The glass paste composition of claim 1, wherein the binder resin (B) is contained in an amount of 5 to 40 parts by weight based on 100 parts by weight of the glass powders.

7. The glass paste composition of claim 1, wherein the organic solvent (C) is at least one selected from the group consisting of diethyl ketone, methyl butyl ketone, dipropyl ketone, cyclohexanone, n-pentanol, 4-methyl-2-pentanol, cyclohexanol, diacetone alcohol, ethylene glycol monomethyl ether, ethylene glycol monoethyl ether, ethylene glycol monobutyl ether, propylene glycol monomethyl ether, propylene glycol monoethyl ether, n-butyl acetate, amyl acetate, ethyl lactate, n-butyl lactate, methyl cellosolve acetate, ethyl cellosolve acetate, propylene glycol monomethyl ether acetate and ethyl-3-ethoxypropionate.

8. The glass paste composition of claim 1, wherein the organic solvent (C) is contained in an amount of 5 to 40 parts by weight based on 100 parts by weight of the glass powders.

9. The glass paste composition of claim 1 which further comprises a silane coupling agent (b) represented by the following formula (2):

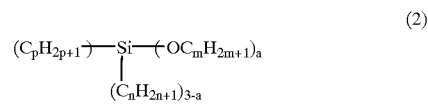

wherein p is an integer of 3 to 20, m is an integer of 1 to 3, n is an integer of 1 to 3, and a is an integer of 1 to 3.

10. The glass paste composition of claim 1 which further comprises polypropylene glycol (E).

11. A transfer film comprising a base film and a film forming material layer made from the glass paste composition of claim 1 and formed on the base film.

12. A method of producing a plasma display panel comprising the steps of:

coating the glass paste composition of claim 1 on a base film to form a film forming material layer, the glass of said glass paste composition being dielectric;

transferring the film forming material layer formed on the base film to a glass substrate; and baking the transferred film forming material layer to form a dielectric layer on the surface of the glass substrate.

13. The glass paste composition of claim 1, wherein the acrylate having a hydrophilic functional group is at least one polymer selected from the group consisting of hydroxyalkyl (meth)acrylates, alkoxyalkyl (meth)acrylates, polyalkylene glycol (meth)acrylates, ethylene glycol monomethyl (meth) acrylate, ethylene glycol monoethyl (meth)acrylate and glycerol (meth)acrylate.

14. A glass paste composition comprising:
   (A) glass powders;
   (B) a binder resin;
   (C) at least one organic solvent selected from the group consisting of a ketone, an alcohol and an ester which satisfy the following conditions (1) and (2):
   condition (1): the normal boiling point is 100 to 200° C., and
   condition (2): the vapor pressure at 20° C. is 0.5 to 50 mmHg, and
   (D) a silane coupling agent represented by the following formula (2):

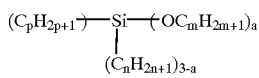

wherein p is an integer of 3 to 20, m is an integer of 1 to 3, n is an integer of 1 to 3, and a is an integer of 1 to 3.

15. The glass paste composition of claim 14, wherein the glass powders have an average particle diameter of 0.3 to 3.0 μm.

16. The glass paste composition of claim 14, wherein the binder resin (B) is an acrylic resin containing a polymerized unit derived from a compound represented by the following formula (1):

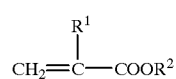

wherein $R^1$ is a hydrogen atom or a methyl group, and $R^2$ is a monovalent organic group.

17. The glass paste composition of claim 16, wherein the acrylic resin is a homopolymer of the compound represented by the above formula (1), a copolymer of two or more compounds represented by the above formula (1), or a copolymer of the compound represented by the above formula (1) and other monomer copolymerizable with said compound.

18. The glass paste composition of claim 16, wherein at least part of the compound represented by the above formula (1) is an acrylate having a hydrophilic functional group.

19. The glass paste composition of claim 14, wherein the acrylate having a hydrophilic functional group is at least one polymer selected from the group consisting of hydroxyalkyl (meth)acrylates, alkoxyalkyl (meth)acrylates, polyalkylene glycol (meth)acrylates, ethylene glycol monomethyl (meth)acrylate, ethylene glycol monoethyl (meth)acrylate and glycerol (meth)acrylate.

20. The glass paste composition of claim 14, wherein the binder resin (B) has a surface tension polar item value of 1 to 15 dyn/cm.

21. The glass paste composition of claim 14, wherein the binder resin (B) has a 95% weight reduction temperature of 350° C. or lower.

22. The glass paste composition of claim 14, wherein the binder resin (B) is contained in an amount of 5 to 40 parts by weight based on 100 parts by weight of the glass powders.

23. The glass paste composition of claim 14, wherein the organic solvent (C) is at least one selected from the group consisting of diethyl ketone, methyl butyl ketone, dipropyl ketone, cyclohexanone, n-pentanol, 4-methyl-2-pentanol, cyclohexanol, diacetone alcohol, ethylene glycol monomethyl ether, ethylene glycol monoethyl ether, ethylene glycol monobutyl ether, propylene glycol monomethyl ether, propylene glycol monoethyl ether, n-butyl acetate, amyl acetate, ethyl lactate, n-butyl lactate, methyl cellosolve acetate, ethyl cellosolve acetate, propylene glycol monomethyl ether acetate and ethyl-3-ethoxypropionate.

24. The glass paste composition of claim 14, wherein the organic solvent (C) is contained in an amount of 5 to 40 parts by weight based on 100 parts by weight of the glass powders.

25. The glass paste composition of claim 14, which further comprises polypropylene glycol (E).

26. A transfer film comprising a base film and a film forming material layer made from the glass paste composition of claim 14 and formed on the base film.

27. A method of producing a plasma display panel comprising the steps of:

coating the glass paste composition of claim 14 on a base film to form a film forming material layer, the glass of said paste composition being dielectric;

transferring the film forming material layer formed on the base film to a glass substrate; and baking the transferred film forming material layer to form a dielectric layer on the surface of the glass substrate.

* * * * *